United States Patent
Lu

(10) Patent No.: US 12,267,896 B2
(45) Date of Patent: Apr. 1, 2025

(54) WIRELESS COMMUNICATION METHOD AND REMOTE TERMINAL

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 58 days.

(21) Appl. No.: 18/077,015

(22) Filed: Dec. 7, 2022

(65) Prior Publication Data
US 2023/0217516 A1 Jul. 6, 2023

Related U.S. Application Data

(63) Continuation of application No. PCT/CN2020/105457, filed on Jul. 29, 2020.

(51) Int. Cl.
*H04W 76/00* (2018.01)
*H04W 8/00* (2009.01)
*H04W 76/14* (2018.01)
*H04W 92/18* (2009.01)

(52) U.S. Cl.
CPC .......... *H04W 76/14* (2018.02); *H04W 8/005* (2013.01); *H04W 92/18* (2013.01)

(58) Field of Classification Search
CPC ...... H04W 76/14; H04W 8/005; H04W 92/18
See application file for complete search history.

(56) References Cited

U.S. PATENT DOCUMENTS

| | | | | |
|---|---|---|---|---|
| 11,785,576 B2* | 10/2023 | Zisimopoulos | ....... | H04W 4/023 455/456.1 |
| 2020/0380266 A1* | 12/2020 | Nadathur | ........... | H04N 21/2347 |
| 2021/0136628 A1* | 5/2021 | Uchiyama | ............. | H04W 28/18 |
| 2021/0400509 A1* | 12/2021 | Lee | ........................ | B60W 40/08 |

(Continued)

FOREIGN PATENT DOCUMENTS

| | | |
|---|---|---|
| CN | 102811263 A | 12/2012 |
| CN | 105050152 A | 11/2015 |
| CN | 111385746 A | 7/2020 |

OTHER PUBLICATIONS

Intel, "On UE-UE Relay Work in SA2 (ProSe) and SA6 (MCPTT)", SA WG2 Meeting #109, S2-151752, May 19, 2015 (May 19, 2015), all pages.

(Continued)

*Primary Examiner* — Khai M Nguyen
(74) *Attorney, Agent, or Firm* — Ladas & Parry, LLP

(57) ABSTRACT

Provided are a wireless communication method and a remote terminal. The method includes that: a first remote terminal determines a first relay terminal for point-to-point communication; and the first remote terminal performs end-to-end communication with a second remote terminal through the first relay terminal. End-to-end communication is converted into point-to-point communication through the first relay terminal, so that when the distance between a sending end and a requesting end is too far, relaying may be performed on a communication link between the first remote terminal and the second remote terminal through the first relay terminal, so as to realize end-to-end communication.

12 Claims, 2 Drawing Sheets

(56) References Cited

U.S. PATENT DOCUMENTS

2022/0103997 A1* 3/2022 Kang .................... H04W 8/005
2023/0199466 A1* 6/2023 Wang ................. H04W 56/001
370/329

OTHER PUBLICATIONS

International Search Report in the international application No. PCT/CN2020/105457, mailed on Apr. 16, 2021 and English translation provided by WIPO.
Written Opinion of the International Search Authority in the international application No. PCT/CN2020/105457, mailed on Apr. 16, 2021 and English translation.
3GPP TS 36.300 V15.7.0 (Sep. 2019), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)".
Supplementary European Search Report in the corresponding European application No. 20947340.4, mailed on Apr. 21, 2023.
Renesas Mobile Europe Ltd: "ProSe communication using UE-to-UE Relay", 3GPP Draft; S2-132705-Prose Communication Using Ue-to-Ue Relay, 3rd Generation Partnership Project (3GPP), Mobile Competence Centre; 650, Route Des Lucioles; F-06921 Sophia-Antipolis Cedex; Franc vol. SA WG2, No. Valencia, Spain; Jul. 15-Jul. 19, 2013, Jul. 9, 2013 (Jul. 9, 2013), XP050726083, all pages.
Intel et al.:"Solution for UE-to-UE Relay", 3GPP Draft; S2-2001374, 3rd Generation Partnership Project (3GPP), Mobilecompetence Centre; 650, Route Des Lucioles; F-06921 Sophia-Antipolis Cedex; France vol. SA WG2, No. Incheon, KR; Jan. 13-Jan. 17, 2020, Jan. 15, 2020 (Jan. 15, 2020), XP051844116, all pages.

* cited by examiner

WIRELESS COMMUNICATION METHOD AND REMOTE TERMINAL

REFERENCE TO RELATED APPLICATION

This is a continuation application of International Patent Application No. PCT/CN2020/105457 filed on Jul. 29, 2020, the disclosures of which are incorporated herein by reference in their entirety.

TECHNICAL FIELD

Embodiments of the disclosure relate to the field of communication, and more particularly to a wireless communication method and a remote terminal.

BACKGROUND

End-to-end communication refers to device to device (D2D) communication. For example, vehicle to vehicle (V2V), vehicle to everything (V2X), D2D, etc. Specifically, a sending end sends a direct communication request (DCR) message to a receiving end, and if a receiving end responds to the DCR message, the receiving end and the sending end may communicate directly.

However, end-to-end communication cannot be realized if the distance between a sending end and a requesting end is too far.

SUMMARY

A wireless communication method and a remote terminal are provided, which can realize long-distance end-to-end communication.

A first aspect provides a wireless communication method, which may include the following operations.

A first remote terminal determines a first relay terminal for point-to-point communication.

The first remote terminal performs end-to-end communication with a second remote terminal through the first relay terminal.

A second aspect provides a remote terminal, which is configured to execute the method in the first aspect or each implementation mode thereof. Specifically, the terminal device includes functional modules configured to execute the method in the first aspect or each implementation mode thereof.

A third aspect provides a remote terminal, which may include a processor and a memory. The memory may be configured to store a computer program, and the processor may be configured to call and run the computer program stored in the memory to execute the method in the first aspect or each implementation mode thereof.

A fourth aspect provides a remote terminal, which is configured to realize the method in the first aspect or each implementation mode thereof. Specifically, a chip may include a processor configured to call and run a computer program in a memory to enable a device installed with the chip to execute the method in the first aspect or each implementation mode thereof.

A fifth aspect provides a computer-readable storage medium, which is configured to store a computer program, the computer program enabling a computer to execute the method in the first aspect or each implementation mode thereof.

A sixth aspect provides a computer program product, which may include a computer program instruction, the computer program instruction enabling a computer to execute the method in the first aspect or each implementation mode thereof.

A seventh aspect provides a computer program, which runs in a computer to enable the computer to execute the method in the first aspect or each implementation mode thereof.

Based on the above technical solutions, end-to-end communication is converted into point-to-point communication through the first relay terminal, so that when the distance between a sending end and a requesting end is too far, relaying may be performed on a communication link between the first remote terminal and the second remote terminal through the first relay terminal, so as to realize end-to-end communication.

DETAILED DESCRIPTION

The technical solutions in the embodiments of the disclosure will be described below in combination with the drawings.

Figure 1:
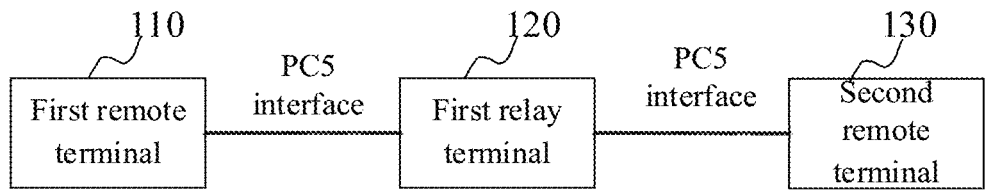
FIG. 1 is an example of an applicable scenario according to an embodiment of the disclosure.

FIG. 1 is an example of a system framework 100 according to an embodiment of the disclosure.

As shown in FIG. 1, the system framework 100 may include a first remote terminal 110, a first relay terminal 120, and a second remote terminal 130. The first remote terminal 110 may communicate with the second remote terminal 130 through the first relay terminal 120. The first remote terminal 110, the first relay terminal 120 and the second remote terminal 130 all support the 3rd generation partnership project (3GPP) new radio (NR) PC5 interface protocol.

As an example, the first remote terminal 110, the first relay terminal 120 and the second remote terminal 130 may be terminal devices that have been authenticated through a network when there is network coverage. The first remote terminal 110 and the second remote terminal may be terminal devices that are authenticated to be accessible to a wireless network through the relay terminal. In other words, the first remote terminal 110 and the second remote terminal are authorized as remote user equipment (UE). The first relay terminal 120 may be a terminal device authenticated to be operable as a relay node. The first remote terminal 110, the first relay terminal 120, and the second remote terminal 130 may all be authorized to send and receive relay discovery-related messages, and the relay discovery-related messages may include a discovery message and a discovery request message.

Herein, the terminal device in the embodiments of the disclosure may be any device or apparatus configured with a physical layer and a media access control layer, and the terminal device may also be referred to as an access terminal. For example, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a personal digital assistant (PDA), a handheld device with a wireless communication function, a computing device, another linear processing device connected to a wireless modem, a vehicle device, a wearable device or the like. The embodiment of the disclosure is described by taking a vehicle terminal as an example, but is not limited thereto.

It is to be understood that FIG. 1 is only an example of the disclosure, and should not be construed as limiting the disclosure.

For example, the system framework 100 may be a system framework for any terminal communicated to another terminal through a relay terminal. For example, the framework 100 may be a system frame for a vehicle terminal communicated to a vehicle terminal through a relay terminal. For example, a remote vehicle is communicated to a remote vehicle through a relay vehicle, a remote vehicle is communicated to other devices through a relay device, a remote terminal is communicated to a remote terminal through a relay terminal, and the like.

Figure 2:
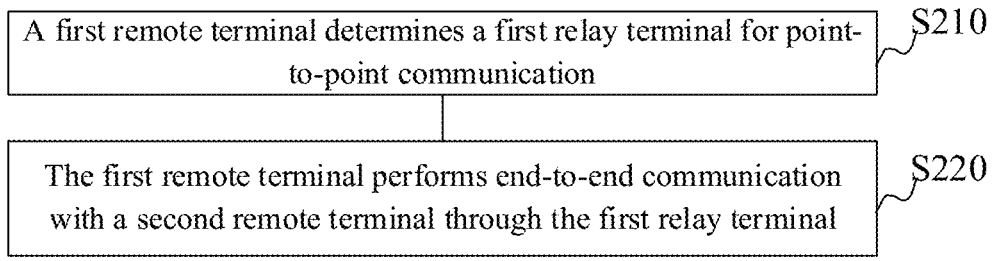
FIG. 2 is a schematic flowchart of a wireless communication method according to an embodiment of the disclosure.

FIG. 2 shows a schematic flowchart of a wireless communication method 200 according to an embodiment of the disclosure. The method 200 may be implemented by a remote terminal, and the method 200 may also be implemented by a sending end. The remote terminal as shown in FIG. 2 may be the first remote device 110 shown in FIG. 1.

As shown in FIG. 2, the method 200 may include some or all of the following contents.

At S210, a first remote terminal determines a first relay terminal for point-to-point communication.

At S220, the first remote terminal performs end-to-end communication with a second remote terminal through the first relay terminal.

For example, the first remote terminal may determine an identifier of the first relay terminal, and the first remote terminal may perform point-to-point communication with the first relay terminal based on the identifier of the first relay terminal, and then may perform end-to-end communication with the second remote terminal through the first relay terminal.

In other words, end-to-end communication is converted into point-to-point communication through the first relay terminal, so that when the distance between the sending end and the requesting end is too far, relaying may be performed on a communication link between the first remote terminal and the second remote terminal through the first relay terminal, so as to realize end-to-end communication.

It is to be understood that the first remote terminal may perform end-to-end communication with the second remote terminal through one or more relay terminals. There are no limits made thereto in the disclosure.

In some embodiments of the disclosure, S210 may include the following operation.

When the first remote terminal determines that the second remote terminal is not within a range of direction communication, the first remote terminal determines the first relay terminal.

In other words, the situation that the second remote terminal is not within the range of direction communication of the first remote terminal may be used as a trigger condition for the first remote terminal to determine the first relay terminal. In other words, when the first remote terminal and the second remote terminal cannot communicate directly, the first remote terminal determines the first relay terminal. For example, when a message transmission between the first remote terminal and the second remote terminal fails or a link establishment fails, the first remote terminal determines the first relay terminal so as to communicate with the second remote terminal through the first relay terminal. Based on this, even if the first remote terminal and the second remote terminal cannot communicate directly, end-to-end communication between the first remote terminal and the second remote terminal may also be guaranteed by use of the first relay terminal.

An implementation mode in which the first remote terminal determines that the second remote terminal is not within the range of direction communication will be described below.

In some embodiments of the disclosure, the method 200 may further include the following operation.

The first remote terminal determines that the second remote terminal is not within the range of direction communication.

In some embodiments of the disclosure, the first remote terminal may send a DCR to the second remote terminal. In response to not receiving a response message to the DCR from the second remote terminal by the first remote terminal, the first remote terminal determines that the second remote terminal is not within the range of direct communication.

In other words, whether the first remote terminal receives the response message to the DCR is used as a condition for the first remote terminal to determine whether the second remote terminal is within the range of direct communication.

Whether the first remote terminal receives the response message to the DCR may also be used as a triggering condition for the first remote terminal to determine the first relay terminal. As an example, the first remote terminal may determine whether the first relay terminal needs to be determined based on whether the response message to the DCR sent by the second remote terminal is received. For example, in response to the first remote terminal receiving the response message to the DCR from the second remote terminal, the first remote terminal determines that the first relay terminal does not need to be determined. For another example, in response to not receiving the response message to the DCR from the second remote terminal by the first remote terminal, the first remote terminal determines the first relay terminal.

In some embodiments of the disclosure, the first remote terminal may send the DCR to the second remote terminal multiple times.

For example, in response to not receiving the response message to the DCR from the second remote terminal after sending the DCR to the second remote terminal multiple times by the first remote terminal, the first remote terminal determines that the second remote terminal is not within the range of direct communication.

In some embodiments of the disclosure, in response to not receiving the response message to the DCR from the second remote terminal within a period of time after sending the DCR to the second remote terminal by the first remote terminal, it is determined that the second remote terminal is not within the range of direct communication. In some embodiments, a duration of the period of time is a preset duration, and/or a duration of the period of time is a duration configured by a network device.

For example, in response to not receiving the response message to the DCR from the second remote terminal by the first remote terminal within a period of time after the first remote terminal sends the DCR to the second remote terminal multiple times, it is determined that the second remote terminal is not within the range of direct communication.

In short, before the first remote terminal attempts to be connected to the second remote terminal through the first relay terminal, the DCR is first sent according to normal steps. If the second remote terminal responds to the DCR, it means that the first remote terminal and the second remote terminal may communicate directly. If the first remote terminal has not received the response message from the second remote terminal within limited time or after the DCR is sent multiple times, it may be confirmed that direct communication between the first remote terminal and the second remote terminal cannot be performed, that is, the second remote terminal is not within the range of direct communication. After the first remote terminal determines that the second remote terminal is not within the range of direct communication, the first remote terminal may find the first relay terminal through a relay discovery process.

In some embodiments of the disclosure, S210 may include the following operations.

The first remote terminal receives a discovery message.

The first remote terminal determines a terminal sending the discovery message as the first relay terminal.

Herein, the discovery message may include information configured to indicate that the first relay terminal is available for providing a relay service, and the discovery message may also directly indicate that the first relay terminal is available for providing relay service. In some embodiments, the discovery message may further include an identifier of the first relay terminal.

In some embodiments of the disclosure, the method 200 may further include the following operation.

The first remote terminal sends a discovery request message, the discovery message being a response message to the discovery request message.

In other words, after sending the discovery request message, the first remote terminal may receive the response message to the discovery request message from the first relay terminal. Alternatively, after receiving the discovery request message from the first remote terminal, the first relay terminal may determine that relay service can be provided for the first remote terminal, and the first relay terminal may send a response to the discovery message to the first remote terminal.

Figure 3:
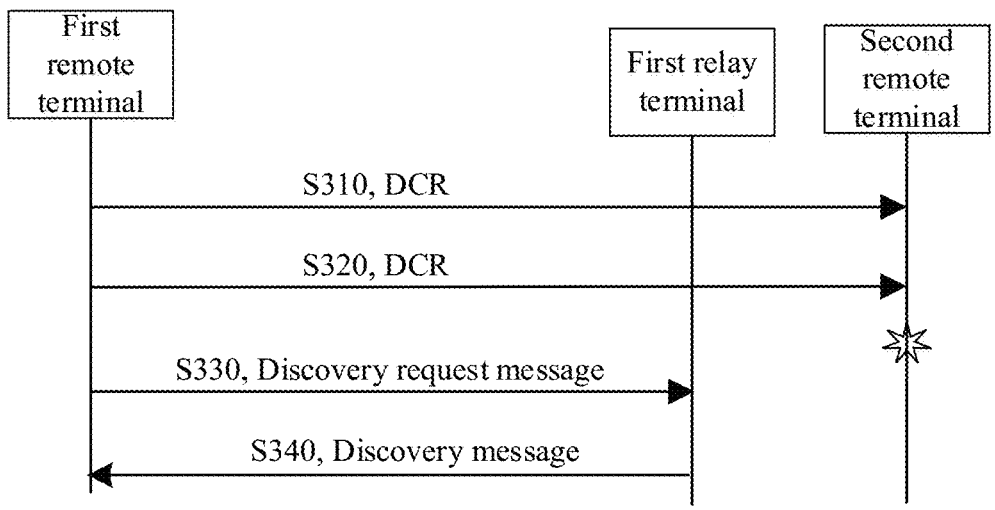
FIG. 3 is another schematic flowchart of a wireless communication method according to an embodiment of the disclosure.

FIG. 3 is another schematic flowchart of a wireless communication method 300 according to an embodiment of the disclosure.

As shown in FIG. 3, the method 300 may include the following operations.

At S310, the first remote terminal sends the DCR to the second remote terminal for the first time.

At S320, the first remote terminal sends the DCR to the second remote terminal for the second time.

At S330, the first remote terminal sends the discovery request message to the first relay terminal.

At S340, the first remote terminal receives the discovery message from the first relay terminal.

In other words, if the first remote terminal sends the DCR to the second remote terminal twice and the first remote terminal does not receive a response message to the DCR from the second remote terminal, the first remote terminal and the first relay terminal determine the first relay terminal as a relay terminal between the first remote terminal and the second remote terminal by exchanging the discovery request message and the discovery message.

It is to be understood that FIG. 3 is an example of sending the DCR multiple times. In other alternative embodiments, the multiple times for sending the DCR may be other values. No specific limits are made thereto in the disclosure.

S330 and S340 are only examples of the disclosure. In other alternative embodiments, the first remote terminal may receive the discovery message from the first relay terminal by monitoring. In other words, the first relay terminal may automatically sends the discovery message. For example, the first relay terminal may periodically send the discovery messages.

In some embodiments of the disclosure, the method 200 may further include the following operation.

The first remote terminal determines whether to determine the terminal sending the discovery message as the first relay terminal.

For example, after receiving the discovery message, the first remote terminal determines whether to determine the terminal sending the discovery message as the first relay terminal.

In some embodiments of the disclosure, the method 200 may further include the following operations.

The first remote terminal measures physical sidelink control channel reference signal receiving power (PSSCH_RSRP) of the discovery message. The first remote terminal determines whether to determine the terminal sending the discovery message as the first relay terminal by comparing a measured value of the PSSCH_RSRP with a first threshold. In some embodiments, the first threshold is a preset threshold, or the first threshold is a threshold configured by a network device.

For example, in response to the PSSCH_RSRP being greater than or equal to the first threshold, the first remote terminal determines the terminal sending the discovery message as the first relay terminal. For example, the first remote terminal may measure the discovery message, and when the measured PSSCH_RSRP is higher than the first threshold and the discovery message contains parameter information related to a service that the first remote terminal wants to transmit, the first remote terminal determines that the terminal sending the discovery message can provide required relay service for the first remote terminal by parsing the parameter information in the discovery message, and then the first remote terminal determines the terminal sending the discovery message as the first relay terminal.

In other alternative embodiments, the first remote terminal may also measure other measured values of the discovery message, for example, physical sidelink control channel reference signal receiving quality (PSSCH_RSRQ) of the discovery message. That is, the first remote terminal may measure the PSSCH_RSRQ of the discovery message. The first remote terminal determines whether to determine the terminal sending the discovery message as the first relay terminal by comparing a measured value of the PSSCH_RSR Q with a second threshold. In some embodiments, the second threshold is a preset threshold, or the second threshold is a threshold configured by a network device. The first threshold and the second threshold may be the same, or different.

In some embodiments of the disclosure, the first remote terminal may be a terminal device supporting the PC5 interface protocol.

For example, all the first remote device, the first relay terminal and the second remote device are terminal devices supporting the PC5 interface protocol.

In some embodiments of the disclosure, the first remote terminal may be a terminal device authenticated by network for end-to-end communication.

For example, both the first remote terminal and the second remote terminal are terminal devices authenticated by the network for end-to-end communication.

The preferred implementation modes of the disclosure are described in detail above in combination with the drawings. However, the disclosure is not limited to the specific details of the above implementation modes. Various simple modifications may be made to the technical solutions of the disclosure within the scope of the technical conception of the disclosure. These simple modifications all belong to the scope of protection of the disclosure. For example, the various specific technical features described in the above specific implementation modes may be combined in any suitable way without conflicts. In order to avoid unnecessary repetitions, no more descriptions will be made to the various possible combinations in the disclosure. For another example, the various implementation modes of the disclosure may also be combined arbitrarily, and should also be regarded as the content disclosed in the disclosure without departing from the conception of the disclosure.

It is to be understood that, in various method embodiments of the disclosure, a magnitude of a sequence number of each above process does not mean an execution sequence and the execution sequence of each process may be determined by its function and an internal logic and does not form any limit to an implementation process of the embodiments of the disclosure. In addition, in the embodiments of the disclosure, the terms "downlink" and "uplink" are used to indicate transmission directions of a signal or data. Herein, "downlink" is used to indicate that a transmission direction of a signal or data is a first direction sent from a site to a UE of a cell, and "uplink" is used to indicate that a transmission direction of a signal or data is a second direction sent from the UE of the cell to the site. For example, "downlink signal" indicates that the transmission direction of the signal is the first direction. In addition, the term "and/or" in the embodiments of the disclosure is only an association relationship describing associated objects and represents that three relationships may exist. Specifically, A and/or B may represent three conditions: independent existence of A, existence of both A and B and independent existence of B. In addition, the character "/" in the disclosure usually represents that previous and next associated objects have an "or" relationship.

The method embodiments of the disclosure are described in detail above in combination with FIGS. 1 to 3, and the apparatus embodiments of the disclosure are described in detail below in combination with FIGS. 4 to 6.

Figure 4:
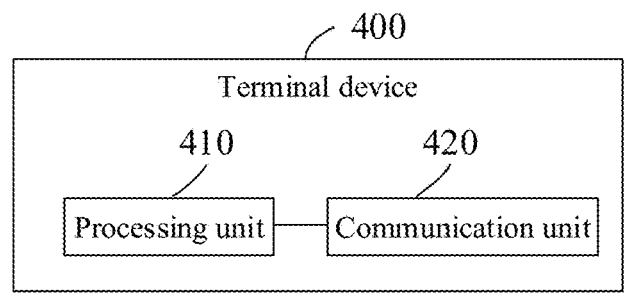
FIG. 4 is a schematic block diagram of a terminal device according to an embodiment of the disclosure.

FIG. 4 is a schematic block diagram of a terminal device 400 according to an embodiment of the disclosure.

As shown in FIG. 4, the terminal device 400 may include: a processing unit 410 and a communication unit 420.

The processing unit 410 is configured to determine a first relay terminal for point-to-point communication.

The communication unit 420 is configured to perform end-to-end communication with a second remote terminal through the first relay terminal.

In some embodiments of the disclosure, the processing unit 410 is specifically configured to determine the first relay terminal in response to the terminal device 400 determining that the second remote terminal is not within a range of direction communication.

In some embodiments of the disclosure, the processing unit 410 is further configured to determine that the second remote terminal is not within the range of direction communication.

In some embodiments of the disclosure, the communication unit 420 is further configured to send a DCR to the second remote terminal, and the processing unit 410 is specifically configured to determine that the second remote terminal is not within the range of direct communication in response to not receiving a response message to the DCR from the second remote terminal by the terminal device 400.

In some embodiments of the disclosure, the communication unit 420 is specifically configured to send the DCR to the second remote terminal multiple times.

In some embodiments of the disclosure, the processing unit 410 is specifically configured to determine that the second remote terminal is not within the range of direct communication in response to not receiving the response message to the DCR from the second remote terminal within a period of time after the sending the DCR to the second remote terminal by the terminal device 400.

In some embodiments of the disclosure, a duration of the period of time may be a preset duration, and/or a duration of the period of time may be a duration configured by a network device.

In some embodiments of the disclosure, the communication unit 420 is further configured to receive a discovery message, and the processing unit 410 is specifically configured to determine a terminal sending the discovery message as the first relay terminal.

In some embodiments of the disclosure, the communication unit 420 is further configured to send a discovery request message, the discovery message being a response message to the discovery request message.

In some embodiments of the disclosure, the processing unit 410 is further configured to determine whether to determine the terminal sending the discovery message as the first relay terminal.

In some embodiments of the disclosure, the processing unit 410 is further configured to:
measure PSSCH_RSRP of the discovery message; and
determine whether to determine the terminal sending the discovery message as the first relay terminal by comparing a measured value of the PSSCH_RSRP with a first threshold.

In some embodiments of the disclosure, the processing unit 410 is specifically configured to determine the terminal sending the discovery message as the first relay terminal in response to the PSSCH_RSRP being greater than or equal to the first threshold.

In some embodiments of the disclosure, the first threshold may be a preset threshold, or the first threshold may be a threshold configured by the network device.

In some embodiments of the disclosure, the terminal device 400 may be a terminal device supporting a PC5 interface protocol.

In some embodiments of the disclosure, the terminal device 400 may be a terminal device authenticated by network for end-to-end communication.

It is to be understood that the apparatus embodiments and the method embodiments may correspond to each other, and similar descriptions may refer to the method embodiments. Specifically, the terminal device 400 shown in FIG. 4 may correspond to the corresponding main body in implementation of the methods 200 and 300 in the embodiments of the disclosure, and the above and other operations and/or functions of the various units in the terminal device 400 are for the purpose of implementing the corresponding flows in each method in FIG. 1. For simplicity, no more elaborations will be made herein.

The communication device of the embodiments of the disclosure is described above from the perspective of functional modules in combination with the drawings. It is to be understood that the functional module may be implemented in a hardware form, or may be implemented by an instruction in a software form, or may also be implemented by a combination of hardware and software modules. Specifically, each step of the method embodiments in the embodiments of the disclosure may be completed through an integrated logical circuit of hardware in a processor and/or an instruction in a software form. The steps of the method disclosed in combination with the embodiments of the disclosure may directly be embodied to be executed and completed by a hardware decoding processor or executed and completed by a combination of hardware and software modules in the decoding processor. In some embodiments, the software module may be located in a mature storage medium in this field such as a random access memory (RAM), a flash memory, a read-only memory (ROM), a programmable ROM (PROM) or an electrically erasable PROM (EEPROM) and a register. The storage medium may be located in the memory, and the processor may read information in the memory to complete the steps of the above method embodiments in combination with hardware.

For example, the processing unit and the communication unit referred to above may be implemented by the processor and a transceiver respectively.

Figure 5:
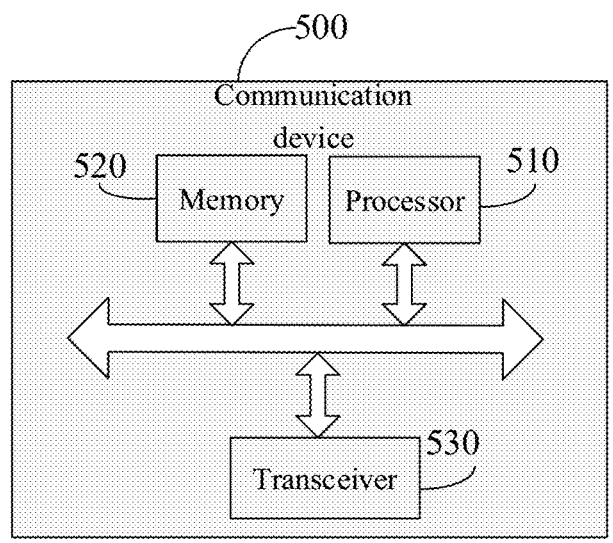
FIG. 5 is another schematic block diagram of a communication device according to an embodiment of the disclosure.

FIG. 5 is another schematic block diagram of a communication device 500 according to an embodiment of the disclosure.

As shown in FIG. 5, the communication device 500 may include a processor 510.

Herein, the processor 510 may call and run a computer program in the memory to implement the method in the embodiments of the disclosure.

Referring to FIG. 5, the communication device 500 may further include a memory 520.

Herein, the memory 520 may be configured to store indication information, and may also be configured to store codes, instructions, etc. executable by the processor 510. The processor 510 may call and run a computer program in the memory 520 to implement the method in the embodiments of the disclosure. The memory 520 may be a separate device independent of the processor 510, or may be integrated in the processor 510.

Referring to FIG. 5, the communication device 500 may further include a transceiver 530.

Herein, the processor 510 may control the transceiver 530 to communicate with other devices. Specifically, the processor 510 may send information or data to other devices, or receive information or data from other devices. The transceiver 530 may include a transmitter and a receiver. The transceiver 530 may further include an antenna. The number of the antennas may be one or more.

It is to be understood that various components in the communication device 500 may be connected through a bus system. Herein, in addition to a data bus, the bus system may further include a power bus, a control bus, and a status signal bus.

It is also to be understood that the communication device 500 may be configured to implement the corresponding flows implemented by the terminal device in each method of the embodiments of the disclosure, that is, the communication device 500 of the embodiments of the disclosure may correspond to the terminal device 400 in the embodiments of the disclosure, and may correspond to the corresponding main body in implementing the methods 200 and 300 of the embodiments of the disclosure. For simplicity, no more elaborations will be made herein.

In addition, the embodiments of the disclosure also provide a chip.

For example, the chip may be an integrated circuit chip with signal processing capability for implementing or executing each method, step, and logic block diagram disclosed in the embodiments of the disclosure. The chip may also be referred to as a system-on-chip, a system chip, a chip system, or a system-on-chip, or the like. In some embodiments, the chip may be applied to various communication devices, so that the communication device installed with the chip may execute each method, step and logic block diagram disclosed in the embodiments of the disclosure.

Figure 6:
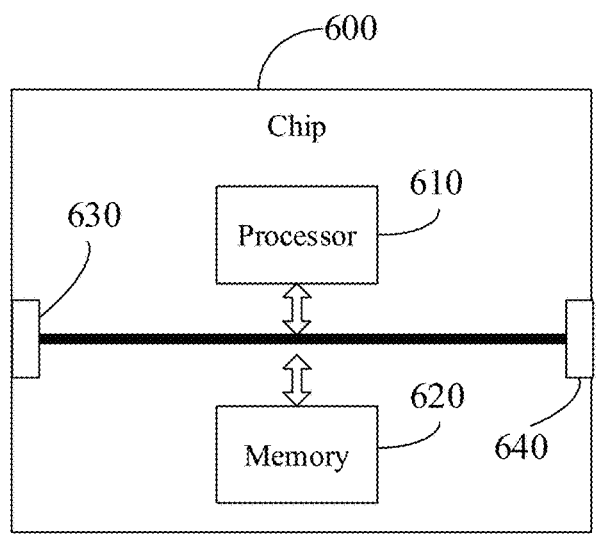
FIG. 6 is a schematic block diagram of a chip according to an embodiment of the disclosure.

FIG. 6 is a schematic block diagram of a chip 600 according to an embodiment of the disclosure.

As shown in FIG. 6, the chip 600 includes a processor 610.

Herein, the processor 610 may call and run a computer program in the memory to implement the method in the embodiments of the disclosure.

Referring to FIG. 6, the chip 600 may further include a memory 620.

The processor 610 may call and run a computer program in the memory 620 to implement the method in the embodiments of the disclosure. The memory 620 may be configured to store indication information, and may also be configured to store codes, instructions, etc. executed by the processor 610. The memory 620 may be a separate device independent of the processor 610, or may be integrated in the processor 610.

Referring to FIG. 6, the chip 600 may further include an input interface 630.

Herein, the processor 610 may control the input interface 630 to communicate with another device or chip, specifically acquiring information or data from other devices or chips.

Referring to FIG. 6, the chip 600 may further include an output interface 640.

Herein, the processor 610 may control the output interface 640 to communicate with other devices or chip, specifically outputting information or data sent by other devices or chips.

It is to be understood that the chip 600 may be applied to the network device in the embodiment of the disclosure. The chip may implement corresponding flows implemented by the network device in each method of the embodiments of the disclosure, and may also implement corresponding flows implemented by the terminal device in each method of the embodiments of the disclosure. For simplicity, no more elaborations will be made herein.

It is to be understood that various components in the chip 600 may be connected through a bus system. Herein, in addition to a data bus, the bus system may further include a power bus, a control bus, and a status signal bus.

The processor referred to above may include, but is not limited to:

a universal processor, a digital signal processor (DSP), an application specific integrated circuit (ASIC), a field programmable gate array (FPGA) or another programmable logical device, discrete gate or transistor logical device and discrete hardware component.

The processor may be configured to implement or execute each method, step and logical block diagram disclosed in the embodiments of the disclosure. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in a memory, and the processor reads information in the memory, and completes the steps of the method in combination with hardware.

The memory referred to above may include, but is not limited to:

a volatile memory and/or a nonvolatile memory. Herein, the nonvolatile memory may be a ROM, a PROM, an erasable PROM (EPROM), an EEPROM or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM).

It is to be noted that the memory described herein is intended to include, but not limited to, memories of these and any other proper types.

The embodiments of the disclosure also provide a computer-readable storage medium, which is configured to store a computer program. The computer-readable storage medium stores one or more programs including instructions. When executed by a portable electronic device including a plurality of disclosure programs, the instructions enable the portable electronic device to execute the methods of the embodiments shown by the methods 200 to 300.

In some embodiments, the computer-readable storage medium may be applied to a network device in the embodiments of the disclosure, and the computer program enables a computer to execute corresponding flows implemented by the network device in each method of the embodiments of the disclosure. For simplicity, no more elaborations will be made herein.

In some embodiments, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, no more elaborations will be made herein.

The embodiments of the disclosure also provide a computer program product, which includes a computer program.

In some embodiments, the computer program product may be applied to a network device in the embodiments of the disclosure, and the computer program enables a computer to execute corresponding flows implemented by the network device in each method of the embodiments of the disclosure. For simplicity, no more elaborations will be made herein.

In some embodiments, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, no more elaborations will be made herein.

The embodiments of the disclosure also provide a computer program. When the computer program is executed by the computer, the computer may execute the methods of the embodiments shown in the methods 200 to 300.

In some embodiments, the computer program may be applied to a network device in the embodiments of the disclosure, and the computer program runs in a computer to enable the computer to execute corresponding flows implemented by the network device in each method of the embodiments of the disclosure. For simplicity, no more elaborations will be made herein.

In addition, the embodiments of the disclosure further provide a communication system, which may include the above terminal device and network device to form a communication system 100 shown in FIG. 1. For simplicity, no more elaborations will be made herein. It is to be noted that the terms "system" and the like herein may also be referred to as "network management architecture" or "network system" and the like.

It is also to be understood that the terms used in the embodiments and the appended claims of the disclosure are only for describing the specific embodiments and are not intended to limit the embodiments of the disclosure.

For example, singular forms "a/an", "said", "above" and "the" used in the embodiments and appended claims of the disclosure are also intended to include plural forms unless other meanings are clearly expressed in the context.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the embodiments of the disclosure.

When being realized in form of software functional unit and sold or used as an independent product, the function may also be stored in a computer-readable storage medium. Based on such an understanding, the technical solutions of the embodiments of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The aforementioned storage medium includes: various media capable of storing program codes such as a U disk, a mobile hard disk, a ROM, a RAM, a magnetic disk or an optical disk.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner.

For example, division of the units or modules or components in the device embodiments described above is only logic function division, and other division manners may be adopted during practical implementation. For example, a plurality of units or components may be combined or integrated into another system, or some units or modules or components may be neglected or not executed.

For another example, the units/modules/components described as separate/display parts may or may not be physically separated, namely, the units/modules/components may be located in the same place, or may be distributed to a plurality of network units. Part or all of the units/modules/components may be selected according to a practical requirement to achieve the purposes of the embodiments of the disclosure.

Finally, it is to be noted that, mutual coupling or direct coupling or communication connection between the above shown or discussed components may be implemented through interfaces, and indirect coupling or communication connection between the devices or the units may be electrical and mechanical or in other forms.

The above is only the specific implementation mode of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the disclosure. Therefore, the scope of protection of the embodiments of the disclosure shall be subject to the scope of protection of the claims.

The invention claimed is:

1. A wireless communication method, comprising:
   determining, by a first remote terminal, a first relay terminal for point-to-point communication; and
   performing, by the first remote terminal, end-to-end communication with a second remote terminal through the first relay terminal,
   wherein the determining, by a first remote terminal, a first relay terminal for point-to-point communication comprises:
   receiving, by the first remote terminal, a discovery message; and
   determining, by the first remote terminal, a terminal sending the discovery message as the first relay terminal,
   wherein the method further comprises:
   sending, by the first remote terminal, a discovery request message, the discovery message being a response message to the discovery request message;
   measuring, by the first remote terminal, physical sidelink shared channel reference signal received power (PSSCH_RSRP) of the discovery message; and
   determining, by the first remote terminal, the terminal sending the discovery message as the first relay terminal in response to a measured value of the PSSCH_RSRP being greater than a first threshold.

2. The method of claim 1, wherein the determining, by a first remote terminal, a first relay terminal for point-to-point communication comprises:
   when the first remote terminal determines that the second remote terminal is not within a range of direction communication, determining, by the first remote terminal, the first relay terminal.

3. The method of claim 1, further comprising:
   sending, by the first remote terminal, a direct communication request (DCR) to the second remote terminal; and
   in response to not receiving a response message to the DCR by the first remote terminal from the second remote terminal, determining, by the first remote terminal, that the second remote terminal is not within a range of direct communication.

4. The method of claim 3, wherein the determining, by the first remote terminal, that the second remote terminal is not within the range of direct communication comprises:
   in response to not receiving the response message to the DCR from the second remote terminal within a period of time after sending the DCR to the second remote terminal by the first remote terminal, determining that the second remote terminal is not within the range of direct communication.

5. The method of claim 4, wherein a duration of the period of time comprises at least one of followings: a preset duration, or, a duration configured by a network device.

6. The method of claim 1, wherein the first remote terminal is a terminal device supporting a PC5 interface protocol.

7. A communication device, comprising:
   a memory, configured to store a computer program; and
   a processor, configured to execute the computer program stored in the memory to cause the communication device to perform a method comprising:
   determining a first relay terminal for point-to-point communication;
   performing end-to-end communication with a second remote terminal through the first relay terminal,
   wherein the determining a first relay terminal for point-to-point communication comprises:
   receiving a discovery message; and
   determining a terminal sending the discovery message as the first relay terminal;
   wherein the method further comprises:
   sending a discovery request message, the discovery message being a response message to the discovery request message;
   measuring physical sidelink shared channel reference signal received power (PSSCH_RSRP) of the discovery message; and
   determining the terminal sending the discovery message as the first relay terminal in response to a measured value of the PSSCH_RSRP being greater than a first threshold.

8. The communication device of claim 7, wherein the communication device is configured to:
   determine the first relay terminal when the communication device determines that the second remote terminal is not within a range of direction communication.

9. The communication device of claim 7, wherein the communication device is further configured to:
   send a direct communication request (DCR) to the second remote terminal; and
   determine that the second remote terminal is not within a range of direct communication in response to not receiving a response message to the DCR from the second remote terminal by the communication device.

10. The communication device of claim 9, wherein the communication device is configured to:
    determine that the second remote terminal is not within the range of direct communication in response to not receiving the response message to the DCR from the second remote terminal within a period of time after sending the DCR by the communication device to the second remote terminal.

11. The communication device of claim 10, wherein a duration of the period of time comprises at least one of followings: a preset duration, or, a duration configured by a network device.

12. The communication device of claim 7, wherein the communication device is a terminal device supporting a PC5 interface protocol.

\* \* \* \* \*